United States Patent [19]

Blanchet-Fincher

[11] Patent Number: 5,238,471
[45] Date of Patent: Aug. 24, 1993

[54] SPRAY-APPLIED FLUOROPOLYMER FILMS FOR GAS SEPARATION MEMBRANES

[75] Inventor: Graciela B. Blanchet-Fincher, Wilmington, Del.

[73] Assignee: E. I. Du Pont de Nemours and Company, Wilmington, Del.

[21] Appl. No.: 960,998

[22] Filed: Oct. 14, 1992

[51] Int. Cl.⁵ .................... B01D 53/22; B01D 71/32
[52] U.S. Cl. .......................................... 96/13; 55/524; 427/245; 427/553; 427/581
[58] Field of Search ............... 55/16, 158, 524; 427/245, 384, 487, 532, 553, 581

[56] References Cited

U.S. PATENT DOCUMENTS

| | | | |
|---|---|---|---|
| 4,230,463 | 10/1980 | Henis et al. | 55/16 |
| 4,415,608 | 11/1983 | Epperson et al. | 427/245 X |
| 4,504,228 | 3/1985 | Maetani et al. | 433/199 |
| 4,767,422 | 8/1988 | Bikson et al. | 55/16 |
| 4,776,936 | 10/1988 | Smith et al. | 55/158 X |
| 4,881,954 | 11/1989 | Bikson et al. | 55/158 X |
| 4,906,377 | 3/1990 | Yen et al. | 55/158 X |
| 4,976,897 | 12/1990 | Callahan et al. | 427/245 X |
| 5,049,167 | 9/1991 | Castro et al. | 55/158 X |
| 5,051,113 | 9/1991 | Nemser | 55/16 |
| 5,051,114 | 9/1991 | Nemser et al. | 55/16 |
| 5,053,059 | 10/1991 | Nemser | 55/16 |
| 5,131,927 | 7/1992 | Bikson et al. | 55/158 X |
| 5,160,353 | 11/1992 | Gochanour | 55/158 |
| 5,178,940 | 1/1993 | Matsumoto et al. | 55/158 X |

FOREIGN PATENT DOCUMENTS

| | | |
|---|---|---|
| 9015662 | 12/1990 | PCT Int'l Appl. |
| 1039295 | 6/1962 | United Kingdom. |
| 2229728 | 10/1990 | United Kingdom. |

OTHER PUBLICATIONS

Resnick, Polym. Prepr., Amer. Chem. Soc., Div. Polym. Chem., 31(1), 312 (1990).

*Primary Examiner*—Robert Spitzer

[57] ABSTRACT

Disclosed is a process for preparing gas separation membranes wherein a thin film of an amorphous fluoropolymer is spray-deposited as an aerosol onto a microporous substrate and rendered substantially continuous or defect-free by thermal and/or chemical treatment.

22 Claims, 1 Drawing Sheet

SPRAY-APPLIED FLUOROPOLYMER FILMS FOR GAS SEPARATION MEMBRANES

FIELD OF THE INVENTION

This invention relates to the preparation of gas separation membranes comprised of thin, substantially defect-free fluoropolymer films spray-applied to microporous solid substrates.

TECHNICAL BACKGROUND

Gas separation membranes comprising thin layers of amorphous homo- and copolymers of bis-2,2-trifluoromethyl-4,5-difluoro-1,3-dioxole coated onto porous substrates are disclosed in U.S. Pat. Nos. 5,053,059, 5,051,113 and 5,051,114, and in World Patent Application WO 9,015,662. Preferred copolymers contain about 65–99 mole % of dioxole and have a glass transition temperature of at least 140° C. The membranes therefrom show oxygen/nitrogen selectivity of greater than 1.4:1. The fluoropolymer coatings were applied by casting from solution and are preferably less than 10 micrometers thick, more preferably less than 1 micrometer thick.

U.S. patent application Ser. No. 575,266, now U.S. Pat. No. 5,160,353, assigned to the same assignee as the instant case, describes a gas separation membrane comprising a relatively thick polymeric layer supported on a porous substrate, said polymeric layer being coated with an ultrathin layer of another polymer of relatively high selectivity; fluoropolymer coatings are not suggested. The ultrathin layers are about 0.01 to 0.2 micrometers thick.

Resnick, Polym. Prepr., Amer. Chem. Soc., Div. Polym. Chem., 31(1), 312 (1990) discloses amorphous fluoropolymers based on bis-2,2-trifluoromethyl-4,5-difluoro-1,3-dioxole.

SUMMARY OF THE INVENTION

The present invention provides a process for preparing a gas separation membrane comprising a microporous solid substrate having on one surface a thin, substantially continuous film of a bis-2,2-trifluoromethyl-4,5-difluoro-1,3-dioxole polymer, said process comprising the steps of:

(a) preparing a solution of said polymer in an organic liquid solvent;

(b) atomizing the solution from step (a) in an inert gas to form an aerosol spray of droplets, said droplets having an average size of about 1 to about 100 micrometers (microns);

(c) directing said aerosol spray onto, and coating said porous substrate to a film thickness of less than about 100 micrometers, the porous substrate being heated to a temperature in the range of about 125° to about 280° C.; and (d) annealing the polymer film formed in step (c) at a temperature of at least about 280° C. for at least one hour.

The invention also provides a modification of the above process wherein, after step (c) or step (d), the substrate side of the fluoropolymer film is exposed to a solution of a photo-polymerizable composition, and the exposed surface of the film is then irradiated to polymerize the portion of said photopolymerizable composition which has penetrated the film, thereby sealing said film.

DETAILS OF THE INVENTION

The present invention provides a process for preparing gas separation membranes wherein a thin film of an amorphous fluoropolymer is spray-deposited as an aerosol onto a microporous substrate and rendered substantially continuous or defect-free by thermal and/or chemical treatment. It has been found that thin films of surprisingly uniform thickness can be deposited easily by aerosol spray application. An advantage of using a thin gas separatory film supported on a microporous substrate is that good selectivity can be attained while maintaining a high flux of the gases to be separated.

The bis-2,2-trifluoromethyl-4,5-difluoro-1,3-dioxole polymer employed for preparing the thin films of this invention is an amorphous homopolymer or, preferably, an amorphous copolymer of bis-2,2-trifluoromethyl-4,5-difluoro-1,3-dioxole with at least one comonomer selected from the group consisting of tetrafluoroethylene (TFE), perfluoromethyl vinyl ether, vinylidene fluoride and chlorotrifluoroethylene. Preferably the comonomer is TFE. Preferred copolymers have glass transition temperatures of at least 140° C., more preferably at least 180° C. Particularly suitable amorphous copolymers are Teflon TM AF 2400 and 1600 (Du Pont) which contain 15 mole % and 35 mole % of TFE, respectively.

The amorphous 1,3-dioxole polymers are soluble up to about 5% by weight in a number of liquid organic solvents, especially fluorinated solvents such as mixtures of $C_6F_{14}$, $C_7F_{16}$ or $C_8F_{18}$ isomers, fluorinated mixtures containing $(C_4F_9)_2NCF_3$, perfluorotetradecahydrophenanthrene oligomer mixtures, perfluoro-n-methylmorpholine, perfluoro-2-n-butyltetrahydrofuran and $C_8F_{16}O$ cyclic ether mixtures containing perfluoro-2-n-butyltetrahydrofuran, perfluorotributylamine and perfluorotriamylamine. Fluorinated mixtures containing $(C_4F_9)_2NCF_3$, such as Fluorinert ® FC-40 (3M Co.), and $C_8F_{16}O$ cyclic ether mixtures containing perfluoro-2-n-butyltetrahydrofuran (Fluorinert ® F-75, 3M Co.), are preferred solvents.

Solutions of the bis-2,2-trifluoromethyl-4,5-difluoro-1,3-dioxole polymers containing about 0.05% to about 4%, preferably about 0.1% to about 2% by weight of polymer, are prepared by dissolving the finely divided polymer in the solvent, with or without applying heat. Gas separation membranes are prepared by depositing a thin coating of dioxole polymer onto a suitable microporous substrate by means of an aerosol spray comprised of atomized droplets of polymer solution in a carrier gas such as nitrogen or oxygen. The aerosol is prepared in conventional aerosol spray equipment from polymer solution and compressed carrier gas in a ratio of about 1 to 5 parts of solution to 10,000 parts of gas. Typical deposition parameters are about 3–5 liters/min of carrier gas and about 1 to 2 ml/min of polymer solution. Preferably the aerosol is formed using an ultrasonic nebulizer or atomizing nozzle which provides suitable control over droplet size distribution and coating uniformity and thickness. A suitable aerosol nozzle is the Sonotek ® ultrasonic head (Model 12142D, Sonotek Corp.) which delivered a suitably laminar flow of aerosol droplets to the substrate from a distance of about 25 cm.

Droplet size in the aerosol should be within the range of about 1 to about 100 micrometers, preferably about 20 to about 100 micrometers, more preferably about 20 to about 40 micrometers. The uniformity of the deposited film depends at least in part on the distribution of droplet sizes, narrower distributions being preferred. Non-ultrasonic aerosol nozzles normally provide a broader droplet size distribution. Ultrasonic nozzles provide a well-controlled, narrower distribution of aerosol droplet sizes in the preferred range of about 20 to about 40 micrometers, the precise distribution depending on the driving frequency of the piezoelectric element in the nozzle head and the diameter of the orifice delivering the solution. The aerosol is applied to a microporous substrate heated to a temperature in the range of about 125° to about 280° C., preferably about 135° to about 250° C. A uniform, fine-grained, clear polymer film is thereby obtained on the substrate.

The thin fluoropolymer films deposited by the process of this invention are less than about 100 micrometers thick, preferably about 20–60 micrometers, more preferably about 30–50 micrometers in thickness. Thinner films may be applied by the invention process but such films are generally less suitable for uses described herein because of the continued presence of defects (pinholes) even after annealing and/or other post treatment. Film thickness may be measured by surface profilometry using, for example, a DEKTAK IIA surface profile measuring system (Sloan Technology Corp., Santa Barbara, Calif.). Alternatively, film thickness may be determined from the gas permeability of the film-coated substrate structure using the "Resistance Model" described in Henis & Tripodi, Sep. Sci. Technology, Vol. 15, p. 1059 (1980); U.S. Pat. No. 4,230,463. The resistance of the composite structure, i.e., substrate and film, is determined by the resistance of the layers combined in series. The resistance of the substrate is determined from the experimentally determined gas flows through the substrate prior to coating. The resistance of the thin film is calculated from the known dense film permeability of its component polymer. The thickness of the thin film is adjusted to match the measured flux of the higher flux gas to be separated, e.g., oxygen for oxygen/nitrogen separations. This thickness can then be used to calculate the selectivity expected for the film-coated substrate.

Suitable microporous substrates must be sufficiently stable to withstand deposition and annealing temperatures of up to about 400° C. for several hours in air without significant physical or chemical change. By "microporous" is meant average pore size (diameter) in the range of about 0.01 to about 1.0 micrometer, preferably about 0.05 to about 0.5 micrometer. The substrates may be of any thickness, but preferably are conventional microporous membranes, including skinned or partially skinned asymmetric membranes having pores in the above defined size range. Suitable microporous membrane supports include those recited in U.S. Pat. Nos. 5,053,059, 5,051,113 and 5,051,114, and in World Patent Application WO 9,015,662 which are hereby incorporated by reference. A particularly suitable substrate is a nominally 0.2 micron pore size silver membrane (Poretics Corp., Livermore, Calif.) having a thickness of about 42 microns. Convenient membrane thickness is in the range of about 0 to about 100 microns. Any oxide layer on the silver membrane surface can be eliminated by soaking in a sodium sulfate/magnesium metal bath for at least about an hour, followed by drying and promptly coating with fluoropolymer.

Following deposition of the fluoropolymer film onto the microporous substrate, the film is treated thermally and/or chemically to remove defects such as holes which can reduce or destroy the selectivity of the film for gas separation. Thermal treatment involves annealing the coating by heating the film-coated substrate in air, or in an inert atmosphere such as nitrogen or argon, at a temperature of at least about 280°, preferably in the range of about 300° to about 400° C. Annealing time should be at least 1 hour, preferably about 4 to 24 hours.

Chemical treatment of the film may substitute for, or be additional to, annealing. By chemical treatment is meant contacting the film with a solution of a photopolymerizable composition for sufficient time to permit said solution to diffuse into any defects present in the film, usually less than about 1 minute. The solution containing the photopolymerizable composition is typically applied to the uncoated side of the microporous substrate by contacting said substrate with a sponge, filter paper or other porous media saturated with said solution. As a result of capillary action at pinhole defect sites, the solution is drawn through the substrate and into the fluoropolymer film; the solution reaches the surface of the fluoropolymer film via defect passages only. Photopolymerizable composition entering the film is polymerized in situ by exposing the film surface to a polymerizing amount of UV irradiation, and the viscous polymer formed thereby plugs and seals the defects holes and improves gas separation selectivity of the film.

Conventional photopolymerizable compositions may be used in the invention process. Such compositions typically contain one or more polymerizable monomers, one or more photoinitiators, and, optionally, one or more crosslinking agents. One such system is employed in Examples 7–9. Polymerization can be initiated by conventional sources of UV radiation, for example, a Douthitt Option X exposure unit (Douthitt Corp., Detroit, Mich.) having a model TU 64 Violux ® 5002 lamp assembly (Violux Exposure Systems Corp., Bridgeport, Conn.) equipped with a 5027 photopolymer bulb. Suitable solvents for the photopolymerizable compositions will depend on the composition selected and include, but are not limited to, one or more of halogenated hydrocarbons such as methylene dichloride, aliphatic alcohols containing 1–4 carbon atoms, methylethyl ketone and toluene. The concentration of nonvolatile photopolymerizable composition in the solvent is not critical but will normally not exceed about 30% by weight in the solution.

The gas separation membranes prepared by the process of this invention are useful for separating or enriching gases. Separations may include, but are not limited to, the following gas pairs: oxygen and nitrogen, carbon dioxide and nitrogen, helium and hydrogen, carbon dioxide and methane or higher hydrocarbons, and hydrogen and methane or other higher hydrocarbons. Gas separation is useful in combustion engines, medical applications, such as breathing apparatus, furnaces and waste or water treatment applications.

Figure 1:
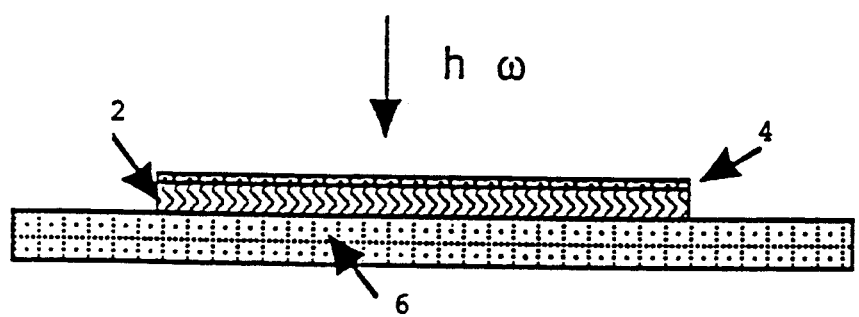
FIG. 1 consists of filter (6), with membrane (2) positioned on top of it. On the side opposite to the filter, membrane (2) has spray-deposited film (4). Filter (6) is soaked with a photo-polymerizable material which is drawn up through membrane (2) as a result of capillary action and reaches the surface of film (4) where pinholes are present in the film. The photopolymerizable material is exposed to UV radiation and polymerizes to seal film (4).

In the following examples of the invention, temperatures are given in degrees Celcius and percentages are by weight. In each example, aerosol spray was distributed over an area of approximately 25 cm².

Selectivity with respect to a mixture of two gases is defined as the ratio of the permeability of the faster (more permeable) gas to the permeability of the slower (less permeable) gas as measured on dense films of the membrane materials. The measurement of permeability is well known to those skilled in the art, for example, see W. J. Koros et al., J. Appl. Polym. Sci., Vol. 21, p. 2899-2904 (1977), which is hereby included by reference. The selectivities of many polymers are listed in the literature, for example, see W. J. Koros et al., Progress in Polym. Sci., Vol. 13, p. 339-401 (1988), which is also hereby included by reference, for a list of such values.

EXAMPLES 1-3

A 0.1% solution of Teflon ® AF 1600 in Fluorinet ® FC-40 was prepared. The heated substrate was placed 25 cm away from the aerosol nozzle, at which distance the Sonotek ® ultrasonic head (Model 12142D, Sonotek Corp.) gave a substantially laminar flow. The aerosol spray was incident normal to the substrate with an estimated droplet size in the range of 6 to 20 $\mu$m. Nitrogen was used as carrier gas, at a flow rate of approximately 4 liters/min. Twenty ml of solution were delivered at a rate of 1.2 ml/min. The substrate temperature during deposition was varied from 135° to 155° C. in the three examples, and in each example controlled within 1% of the desired value. The films were deposited on Poretics silver membranes (Poretics Corporation, Livermore, Calif.) having a nominal pore size of 0.2 micrometer. Any oxide layer on the silver membrane surface was eliminated by soaking the membrane in a sodium sulfate/magnesium metal bath for one hour, then drying and coating promptly afterwards. After the deposition was completed, the coating was annealed at 300° C. for 12 hours. Permeability and selectivity for an oxygen/nitrogen mixture is shown below:

| Ex. | $T_d$ | PermO$_2$ | PermN$_2$ | Sel. |
| --- | --- | --- | --- | --- |
| 1 | 130 | 11,843 | 5,400 | 2.19 |
| 2 | 145 | 14,558 | 7,013 | 2.08 |
| 3 | 155 | 13,703 | 6866 | 1.99 |

$T_d$ is the temperature of the substrate during the deposition of the film, PermO$_2$ and PermN$_2$ are the oxygen and nitrogen permeabilities in centiBarrers, and Sel. is the selectivity of the membrane.

EXAMPLES 4-6

A 1% solution of Teflon ® AF 2400 in Fluorinet ® FC-40 (3M Corp.), a mixture of fluorinated liquids containing (C$_4$F$_9$)$_2$NCF$_3$, was prepared. The aerosol was delivered by a spraying head (Air atomizer model 34 J SS, Spraying Systems Co., Wheaton, Ill.) positioned 25 cm away and incident normal to the substrate with an estimated droplet size in the range of 30 to 80 $\mu$m. Nitrogen was used as carrier gas at a flow rate of approximately 3.5 liters/min. Ten ml of solution were delivered at 1.2 ml/min. The substrate temperature during deposition was 250° C. The films were deposited on Poretics Ag membranes 47 mm in diameter having nominal pore sizes of 0.2 $\mu$m. The membrane in used Example 4 was polished on a Buehler vibromat polisher for one hour using 3 $\mu$m diamond polishing compound. The membranes used in Examples 5 and 6 were used as provided by the vendor without additional surface treatment. After the deposition was complete, the film was annealed at 300° C. for 12 hours in air. Permeation results are given below:

| # | $T_d$ | Perm O$_2$ | Perm.N$_2$ | Sel. |
| --- | --- | --- | --- | --- |
| 4 | 250 | 11580.2 | 5326.4 | 2.17 |
| 5 | 225 | 10814 | 5359 | 2.04 |
| 6 | 175 | 63404 | 35148 | 1.8 |

EXAMPLES 7-9

Solutions of Teflon ® AF 1600 in Fluorinet ® FC-40 were prepared at concentrations of 0.1%, 0.75% and 1.0%. The aerosol was delivered by a spraying head positioned 20 cm away and incident normal to the substrate with an estimated droplet size in the range of 30 to 80 $\mu$m. Nitrogen was used as carrier gas at a flow rate of approximately 4.0 liters/min. Fifteen ml of solution were delivered at a rate of 1.5 ml/min. The substrate temperature during deposition was 175° C. The films were deposited on Poretics Ag membranes 47 mm in diameter having a nominal pore size of 0.2 $\mu$m. The membranes were used as provided by the vendor without additional treatment. After deposition was completed, the coatings were annealed at 230° C. for 6 hours in air to eliminate defects and render the films substantially continuous.

In order to further minimize or totally eliminate leakage, pinhole defects remaining in the membrane films, if any, were plugged using a methylene chloride solution of a photopolymerizable composition as described below. FIG. 1 shows the configuration used to plug possible pinholes in the spray-deposited Teflon ® AF film. A paper filter (6) was soaked with the solution of photopolymerizable material, and the back of the Ag membrane (2) (side without the AF coating) was positioned directly on top. As a result of capillary action, the photopolymerizable solution was drawn to the surface of the AF coating only in those areas where pinholes were present in the film (4). The "sealed" AF film was then exposed to UV radiation by means of a Douthitt Option X exposure unit (Douthitt Corporation, Detroit, Mich.) equipped with a model TU 64 Violux ® 5002 lamp assembly (Violux ® exposure systems Corp., Bridgeport, Conn.), equipped with a 5027 photopolymer bulb. Visible radiation emitted by this source was suppressed by a UV light transmitting Kokomo ® glass filter (No. 400, Kokomo Opalescent Glass Co., Kokomo, Ind.). After the exposure was completed, the membrane was washed in methylene chloride to remove the photosensitive material in the unexposed areas. The photopolymerizable composition consisted of:

| TMPTA | TCTM-HABI | 2MBO | PMMA-2051 |
| --- | --- | --- | --- |
| 27% | 10% | 3% | 60% |

TMPTA = trimethylol propano triacrylate;
TCTM-HABI = 2,2',4,4'-tetrakis(o-chlorophenyl)-5,5'-bis(m,p-dimethoxyphenyl)-biimidazole;
2-MBO = 2-mercaptobenzoxazole;
PMMA = polymethylmethacrylate,
$\eta = 1.25$, where $\theta$ is the inherent viscosity and
$T_g = 95°$ C., where $T_g$ is the glass transition temperature.

Permeation results are given below:

| # | % AF | % S-PP | Perm.O2 | PermN2 | Sel. |
|---|------|--------|---------|--------|------|
| 7 | 0.1  | 25     | 68479   | 34782  | 1.97 |
| 8 | 0.75 | 12.5   | 40435   | 20239  | 2.00 |
| 9 | 1    | 6.25   | 44081   | 21904  | 2.01 |

In the Table, % AF refers to the concentration of Teflon® AF$_{1600}$ in the spraying solution and % S-PP refers to the percent of non-volatile material in the solution of the photo-polymerizable composition.

What is claimed is:

1. A Process for preparing a gas separation membrane comprising a microporous solid substrate having on one surface a thin, substantially continuous film of an amorphous polymer of bis-2,2-trifluoromethyl-4,5-difluoro-1,3-dioxole, said process comprising the steps of:
   (a) preparing a solution of said polymer in an organic liquid solvent;
   (b) atomizing the solution from step (a) in an inert gas to form an aerosol spray of droplets, said droplets having a size in the range of about 1 to about 100 micrometers;
   (c) directing said aerosol spray on to, and coating said porous substrate to a film thickness of less than about 100 micrometers, the porous substrate being heated to a temperature in the range of about 125° to about 280° C.; and
   (d) annealing the polymer film formed in step (c) at a temperature of at least about 280° C. for over 1 hour.

2. Process according to claim 1 wherein the polymer solution comprises about 0.1% to about 4% by weight of polymer and about 96% to about 99.9% by weight of the organic liquid solvent.

3. Process according to claim 1 wherein the organic liquid solvent is fluorinated.

4. Process according to claim 3 wherein the solvent is selected from the group consisting of $C_6F_{14}$, $C_7F_{16}$ or $C_8F_{18}$ isomer mixtures, fluorinated mixtures containing $(C_4F_9)_2NCF_3$, perfluorotetradecahydrophenanthrene oligomer mixtures, perfluoro-n-methylmorpholine, perfluorinated mixtures of $C_8F_{16}O$ cyclic ethers containing perfluoro-2-n-butyltetrahydrofuran, perfluorotributylamine and perfluorotriamylamine.

5. Process according to claim 4 wherein the solvent is a fluorinated mixture containing $(C_4F_9)_2NCF_3$.

6. Process according to claim 1 wherein the amorphous bis-2,2-trifluoromethyl-4,5-difluoro-1,3-dioxole polymer is a homopolymer.

7. Process according to claim 1 wherein the amorphous polymer is a copolymer of bis-2,2-trifluoromethyl-4,5-difluoro-1,3-dioxole with a comonomer selected from the group consisting of tetrafluoroethylene, perfluoromethyl vinyl ether, vinylidene fluoride and chlorotrifluoroethylene.

8. Process according to claim 7 wherein the comonomer is tetrafluoroethylene.

9. Process according to claim 1 wherein the microporous substrate comprises pores having an average size in the range of about 0.01 to about 1 micrometer.

10. Process according to claim 9 wherein the average pore size is about 0.05 to about 0.5 micrometer.

11. Process according to claim 10 wherein the microporous substrate is a porous silver membrane.

12. Process according to claim 1 wherein the film thickness is in the range of about 20 to 50 micrometers.

13. Process according to claim 1 wherein the droplet size is in the range of about 10 to about 50 micrometers.

14. Process according to claim 13 wherein the droplet size is about 20 to about 40 micrometers.

15. Process according to claim 1 wherein the film is annealed at a temperature in the range of about 300° to about 400° C.

16. Process according to claim 1 wherein, after step (c) or (d), the substrate side of the film is exposed to a solution of a photopolymerizable composition and the film is then irradiated to polymerize the portion of photopolymerizable composition which has penetrated the film, thereby sealing said film.

17. Process according to claim 16 wherein the solution of photopolymerizable composition comprises about 70% to about 99% by weight of an organic solvent and about 1% to about 30% by weight of a non-volatile mixture consisting essentially of about 60% polymethylmethacrylate, 27% trimethylolpropanotriacrylate, 10% 2,2',4,4'-tetrakis(o-chlorophenyl)-5,5'-bis(3,4-dimethoxyphenyl)biimidazole, and 3% 2-mercaptobenzooxazole.

18. Process according to claim 17 wherein the organic solvent comprises at least one liquid selected from the group consisting of methylene dichloride, aliphatic alcohols containing 1-4 carbon atoms, methylethyl ketone, and toluene.

19. Process according to claim 16 wherein the film is irradiated with UV radiation.

20. Process according to claim 1 wherein, in step (b), the aerosol spray is comprised of about 1 to about 5 parts of polymer solution to 10,000 parts of inert gas.

21. Process according to claim 20 wherein the inert gas is nitrogen.

22. Gas separation membrane prepared by the process of claim 1.

* * * * *